UNITED STATES PATENT OFFICE.

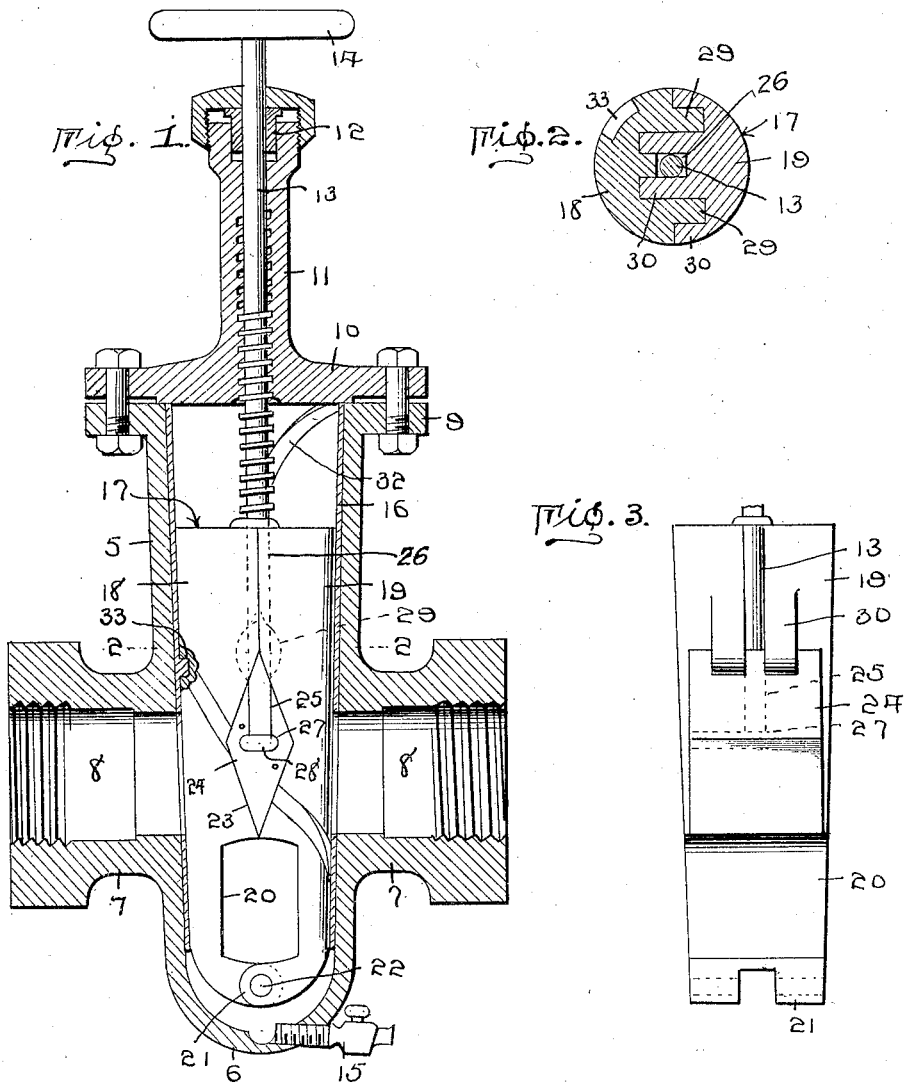

JALMER ANDERSON, OF BURKBURNETT, TEXAS.

VALVE STRUCTURE.

1,389,474.     Specification of Letters Patent.     Patented Aug. 30, 1921.

Application filed July 1, 1920. Serial No. 393,332.

*To all whom it may concern:*

Be it known that I, JALMER ANDERSON, a citizen of the United States, residing at Burkburnett, in the county of Wichita and State of Texas, have invented certain new and useful Improvements in a Valve Structure, of which the following is a specification.

This invention has for its object to provide an improved valve structure especially designed for controlling the flow of fluids under high pressure wherein the valve body consists of hingedly connected sections having connection with the adjusting screw through the medium of an expanding element the function of which is to maintain a tight fit between the opposed sides of the sectional valve body and the ported sides of the valve casing when the valve body is in either of its alternative positions, whereby to effectively prevent the escape of fluid.

A further and more specific object is the provision of means for maintaining proper alinement of the valve sections during adjustment.

With these and other objects in view, the invention consists in certain novel features of construction as hereinafter shown and described and then specifically pointed out in the claims and in the drawings illustrative of the preferred embodiment of the invention.

In the drawings:—

Figure 1 is a vertical transverse section of the valve,

Fig. 2 is a horizontal section through the valve body only, the same being taken on the line 2—2 of Fig. 1, and, Fig. 3 is an elevation of the inner face of one of the valve sections.

Referring to the drawing in detail, wherein similar reference numerals designate corresponding parts throughout the several views, the numeral 5 indicates the valve casing which is provided adjacent its closed end 6 with diametrically opposed and alined extensions 7 communicating with the ports 8 through which the fluid enters and is discharged from the casing. The upper open extremity of the valve casing is provided with a flange 9 over which is bolted or otherwise secured a cap 10 provided with a tubular internally threaded extension 11 receiving a suitable type of packing 12 at its upper terminal to establish a non-leaking joint 13 with the stem of the adjusting screw 13ª. For the convenience in adjustment of the screw, a hand wheel 14 is preferably secured to the upper extremity thereof. The lower closed terminal of the valve casing is preferably provided with a drain cock 15.

A bushing or lining 16 is preferably fitted in the casing 5 and the latter is tapered internally from the upper open end to the closed lower extremity thereof to insure against leakage of the rotatable valve designated generally by the numeral 17.

The valve 17 consists in two sections 18 and 19 which, when properly assembled are substantially cylindrical in form and conform to the internal taper of the bore of the casing 5. The valve 17 is divided along a diametrical longitudinally extending plane to provide the sections 18 and 19 thereof and is provided adjacent its lower relatively small extremity with a diametrical port 20 adapted to be brought into registration with the opposed ports 8 in the valve casing to permit passage of liquid through the valve. The lower extremities of the sections are provided with interfitting ears 21 receiving a pivot pin 22 whereby the scetions are pivotally connected permitting the latter to be expanded to snugly fit the inner face of the bushing 16.

Directly above the port 20, the valve body is provided with a substantially diamond shaped opening 23 in which is mounted the substantially diamond shaped expanding element 24 whose acute angular corners are directed toward the opposite terminals of the valve body in such manner as to tend to separate the valve sections 18 and 19 incident to movement of the expanding element in either direction. A vertical slot 25 is formed halfway through the upper part of the expanding element 24 and registers with a vertical opening 26 provided in the valve body for the reception of the lower extremity of the adjusting screw 13ª. The lower extremity of the slot 25 is enlarged as at 27 to accommodate the headed lower extremity 28 of the adjusting screw whereby a swivel connection is established between the latter and the expanding element.

The portions of the valve sections 18 and 19 contiguous to the opening 23 are formed with interfitting wings 29 and 30, respectively, which are designed to maintain the valve sections in proper alinement during expanding and contracting movements thereof and the wings of one of the valve sections are partially received in recesses 31 formed in the upper relatively narrow portion of the diamond shaped expanding element 24 so as to properly maintain the latter in position between the valve sections and to prevent accidental displacement thereof.

The bushing 16 is formed with a spiral rib 32 received in a groove 33 formed in the valve body 17 whereby the latter is caused to turn a quarter revolution during its movement from opened to closed position or vice versa.

In use, the valve body 17 is moved to closed position, as illustrated in Fig. 1, by proper manipulation of the adjusting screw 13ª and when so disposed, the opposed side faces of the valve body above the port 20 therein are presented to the casing ports 8 and due to the expanding action of the expanding element 24, the opposed valve sections 18 and 19 are maintained in snug engagement with the opposed ported portions of the casing. When the valve is moved to open position by adjustment of the screw 13ª, the valve 17 is rotated a quarter revolution to bring the port 20 thereof into direct registration with the ports 8 of the casing and thereby permitting fluid to readily pass through the valve. The upward movement of the valve body with relation to the casing is limited by engagement thereof with the cap or cover plate 10 and incident to continued rotation of the screw 13ª, the expanding element 24 is actuated to separate the valve sections 18 and 19 and thereby rigidly maintain the valve sections against vibration in the casing.

What I claim is:

1. A valve structure comprising a valve casing, a valve body mounted for movement vertically of said casing, means for producing rotary movement of the valve body incident to the longitudinal movement thereof, adjusting means for the valve body, and means associated with the adjusting means for effecting expansion of the valve body incident to the alternate opening and closing movements thereof.

2. A valve structure comprising a valve casing, a two part valve body mounted for movement vertically of said casing, means for producing rotary movement of the valve body incident to the longitudinal movement thereof, adjusting means for the valve body, and means for effecting relative movement between the parts of said valve body incident to the alternate opening and closing movements thereof.

3. A valve structure comprising a valve casing provided with opposed ports, an elongated valve body mounted for adjustment in the casing and provided with a diametrical port movable into registration with the casing ports, said valve body consisting of relatively movable sections hingedly connected at one end thereof, means for producing rotary movement of the valve body incident to longitudinal movement thereof, adjusting means for the valve body, and means associated with the adjusting means for effecting expansion of the valve body section incident to the alternate opening and closing movements thereof.

4. A valve structure comprising a valve casing provided with opposed ports, a valve body mounted for adjustment in the casing and provided with a diametrical port movable into registration with the casing ports, said valve body consisting of relatively movable sections hingedly connected at one end thereof, means for producing rotary movement of the valve body incident to longitudinal movement thereof, adjusting means for the valve body, and means associated with the adjusting means for effecting expansion of the upper part of the valve body section incident to the alternate opening and closing movements thereof.

5. A valve structure comprising a valve casing provided with opposed ports, a valve body mounted for adjustment in the casing and provided with a diametrical port movable into registration with the casing ports, said valve body consisting of relatively movable sections, means for producing rotary movement of the valve body incident to longitudinal movement thereof, adjusting means for the valve body, and means associated with the adjusting means for effecting expansion of the valve body sections incident to the alternate opening and closing movements thereof.

In testimony whereof I affix my signature hereto.

JALMER ANDERSON.